US010802577B2

(12) United States Patent
Gavriliuc et al.

(10) Patent No.: US 10,802,577 B2
(45) Date of Patent: Oct. 13, 2020

(54) ESTABLISHING VOICE COMMUNICATION CHANNEL

(71) Applicant: Microsoft Technology Licensing, LLC, Redmond, WA (US)

(72) Inventors: Anatolie Gavriliuc, Kirkland, WA (US); Dan Osborn, Woodinville, WA (US); Stephen Heijster, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 214 days.

(21) Appl. No.: 14/731,285

(22) Filed: Jun. 4, 2015

(65) Prior Publication Data

US 2016/0357252 A1    Dec. 8, 2016

(51) Int. Cl.
*H04N 13/128*    (2018.01)
*G06F 3/01*    (2006.01)
(Continued)

(52) U.S. Cl.
CPC ........... *G06F 3/012* (2013.01); *G02B 27/017* (2013.01); *G06F 3/011* (2013.01); *G06F 3/013* (2013.01); *G06F 3/0482* (2013.01); *G06F 3/167* (2013.01); *H04L 65/1059* (2013.01); *H04L 65/1069* (2013.01); *H04N 13/128* (2018.05);
(Continued)

(58) Field of Classification Search
CPC .................................................. H04N 13/0484
See application file for complete search history.

(56) References Cited

U.S. PATENT DOCUMENTS 8,767,014 B2    7/2014 Vaught et al.
2010/0253700 A1    10/2010 Bergeron
(Continued)

FOREIGN PATENT DOCUMENTS

CN    103281506 A    9/2013

OTHER PUBLICATIONS

"Who Would Win a Fight: Virtual Reality or Augmented Reality?", Published on: Jan. 24, 2015 Available at: http://www.sapientdesigns.com/news/who-would-win-a-fight-virtual-reality-or-augmented-reality.
(Continued)

*Primary Examiner* — Dave Czekaj
*Assistant Examiner* — Berteau Joisil
(74) *Attorney, Agent, or Firm* — Alleman Hall Creasman & Tuttle LLP

(57) ABSTRACT

One example provides, on a computing device comprising a display, a method of initiating and conducting voice communication with a contact. The method comprises displaying a user interface on the display, receiving a user input of a position signal for the user interface, and determining that the position signal satisfies a selection condition for a contact based on a location of the position signal on the user interface and a position of a proxy view of the contact on the user interface. The method further comprises, in response to determining that the position signal satisfies the selection condition, selecting the contact for communication, receiving voice input, and responsive to receiving the voice input while the contact is selected for communication, opening a voice communication channel with the contact and sending the voice input to the contact via the voice communication channel.

17 Claims, 6 Drawing Sheets

(51) Int. Cl.
*H04N 13/332* (2018.01)
*H04N 13/383* (2018.01)
*G06F 3/16* (2006.01)
*G06F 3/0482* (2013.01)
*H04L 29/06* (2006.01)
*G02B 27/01* (2006.01)
*H04M 1/27475* (2020.01)
*H04N 13/00* (2018.01)

(52) U.S. Cl.
CPC ......... *H04N 13/332* (2018.05); *H04N 13/383* (2018.05); *G02B 2027/0178* (2013.01); *H04M 1/27475* (2020.01); *H04N 2013/0081* (2013.01)

(56) References Cited

U.S. PATENT DOCUMENTS

| | | | |
|---|---|---|---|
| 2013/0083063 A1* | 4/2013 | Geisner | G06F 3/011 345/633 |
| 2013/0260836 A1* | 10/2013 | Tsunoda | H04M 1/0266 455/566 |
| 2013/0307855 A1 | 11/2013 | Lamb et al. | |
| 2014/0049559 A1 | 2/2014 | Fleck et al. | |
| 2014/0080109 A1 | 3/2014 | Haseltine et al. | |
| 2014/0162730 A1 | 6/2014 | Kim | |
| 2014/0237366 A1* | 8/2014 | Poulos | G06F 3/013 715/728 |
| 2014/0306866 A1 | 10/2014 | Miller et al. | |
| 2014/0361971 A1 | 12/2014 | Sala | |
| 2016/0330595 A1* | 11/2016 | Hammer | H04W 4/10 |

OTHER PUBLICATIONS

Darell, Richard, "3D Holographic Pod Enables Life-Size 3D Phone Calls", Published on: Jan. 25, 2013 Available at: http://www.bitrebels.com/technology/3d-holographic-phone-calls/.

Weiss, C. C., "The Telehuman provides 360 degrees of 3D video chat", Published on: May 4, 2012 Available at: http://www.gizmag.com/3d-hologram-telepod/22412/.

Tang, et al., "HomeProxy: Exploring a Physical Proxy for Video Communication in the Home", In Proceedings of the SIGCHI Conference on Human Factors in Computing Systems, Apr. 27, 2013, pp. 1339-1342.

Dodds, et al., "Talk to the Virtual Hands: Self-Animated Avatars Improve Communication in Head-Mounted Display Virtual Environments", In Proceedings of PLOS One, Oct. 12, 2011, 14 pages.

Leuski, et al., "How to Talk to a Hologram", In Proceedings of the 11th International Conference on Intelligent User Interfaces, Jan. 29, 2006, pp. 360-362.

ISA European Patent Office, International Search Report and Written Opinion Issued in PCT Application No. PCT/US2016/031952, dated Aug. 10, 2016, WIPO, 13 pages.

IPEA European Patent Office, Second Written Opinion Issued in PCT Application No. PCT/US2016/031952, dated Apr. 28, 2017, WIPO, 5 pages.

IPEA European Patent Office, International Preliminary Report on Patentability Issued in PCT Application No. PCT/US2016/031952, dated Jul. 19, 2017, WIPO, 6 pages.

* cited by examiner

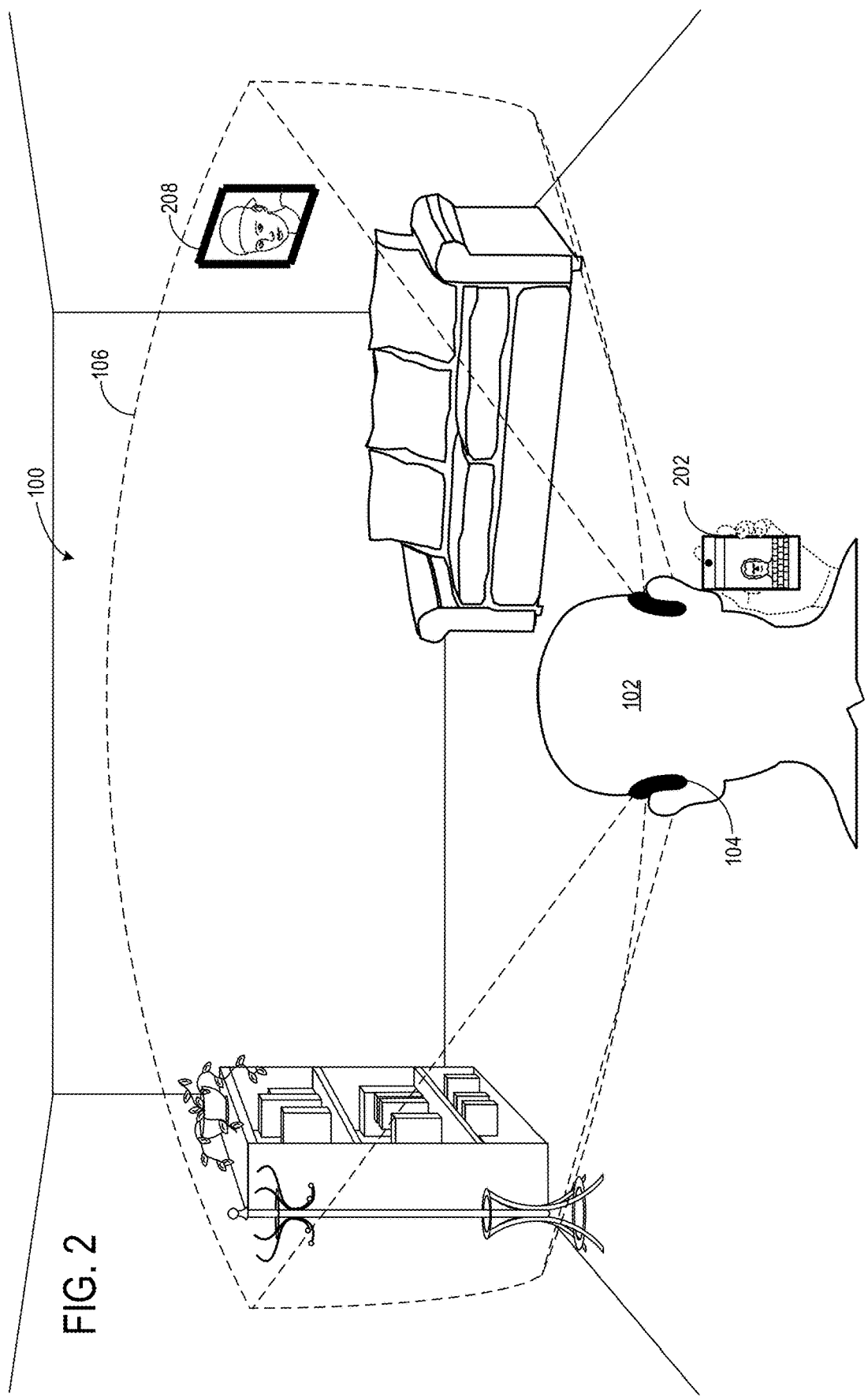

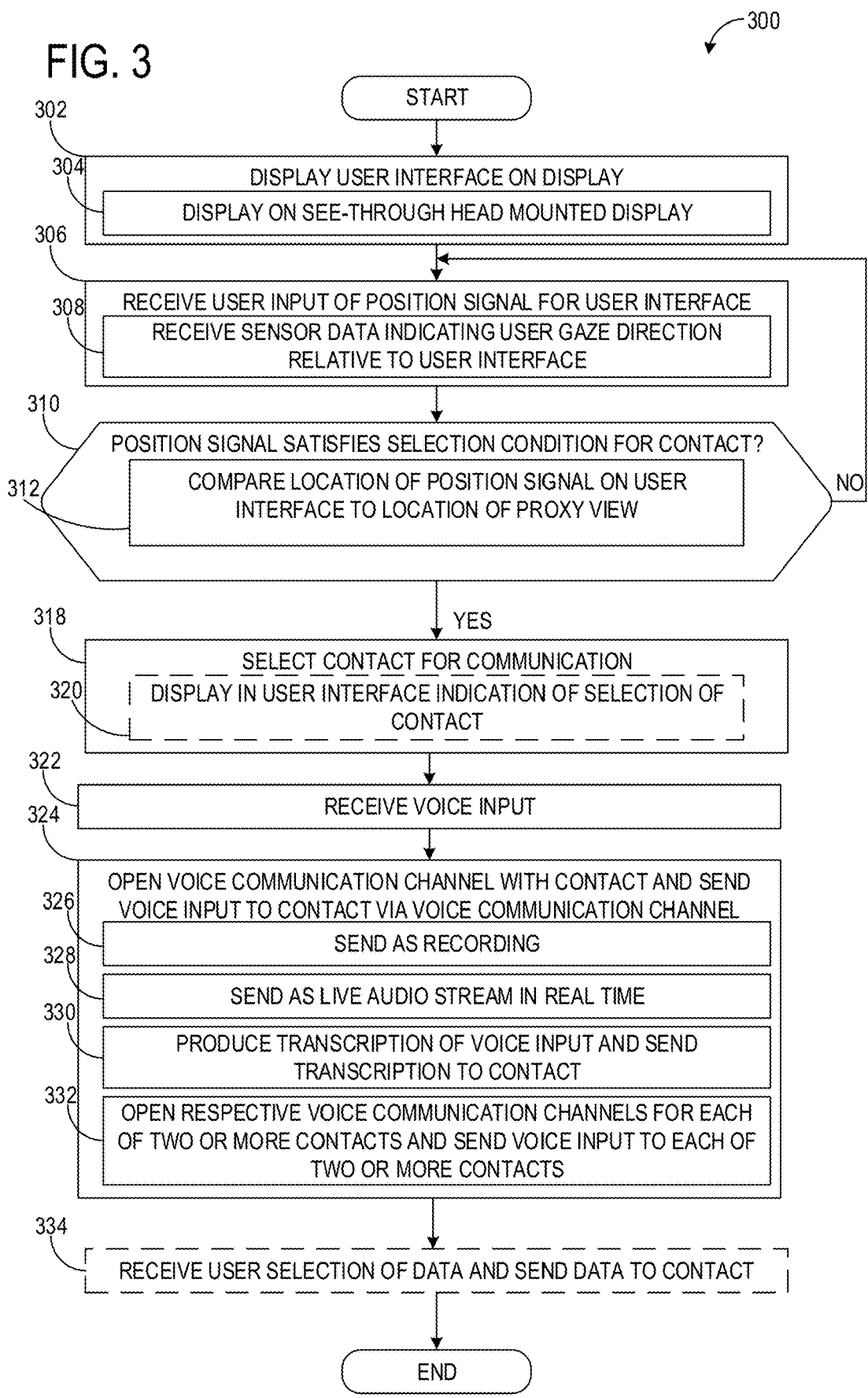

ESTABLISHING VOICE COMMUNICATION CHANNEL

BACKGROUND

When using a computing device for electronic voice communication, a user may open a communications channel with another user by interacting with a graphical user interface, e.g., by pointing to a contact with a cursor and then clicking a mouse button or the like.

SUMMARY

Examples are disclosed herein that relate to establishing a voice communication channel. One example provides, on a computing device comprising a display, a method of initiating and conducting voice communication with a contact. The method comprises displaying a user interface on the display, receiving a user input of a position signal for the user interface, and determining that the position signal satisfies a selection condition for a contact based on a location of the position signal on the user interface and a position of a proxy view of the contact on the user interface. The method further comprises, in response to determining that the position signal satisfies the selection condition, selecting the contact for communication, receiving voice input, and responsive to receiving the voice input while the contact is selected for communication, opening a voice communication channel with the contact and sending the voice input to the contact via the voice communication channel.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 shows various examples of proxy views of a contact.

FIG. 3 shows a flowchart illustrating a method of performing voice communication via a computing device.

DETAILED DESCRIPTION

As mentioned above, the establishment of a communication link to electronically communicate via voice often involves manual steps, such as selecting a mouse button, touch screen, etc. to open a communication channel. However, in some instances, a less manual approach may be desirable. Accordingly, examples are disclosed herein that relate to establishing a voice communications channel by gaze interaction (or other suitable position signal) combined with the commencement of speaking to the desired other communication party. The establishment of a voice communications channel in such a manner may facilitate hands-free interactions.

Figure 1A:
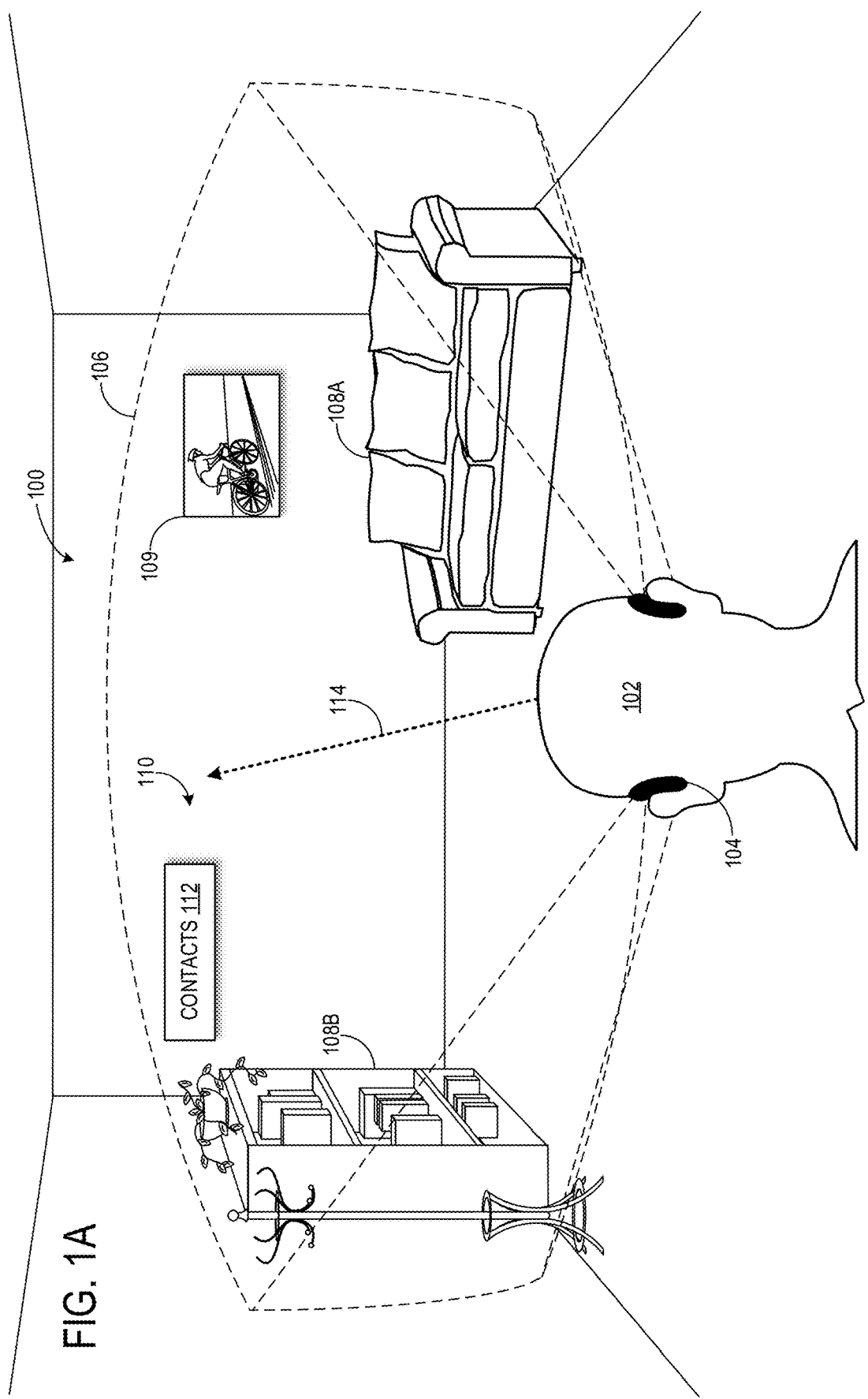
FIGS. 1A-1C illustrate an establishment of a communications channel with a contact via gaze interaction combined with the commencement of voice communication.
Figure 1B:
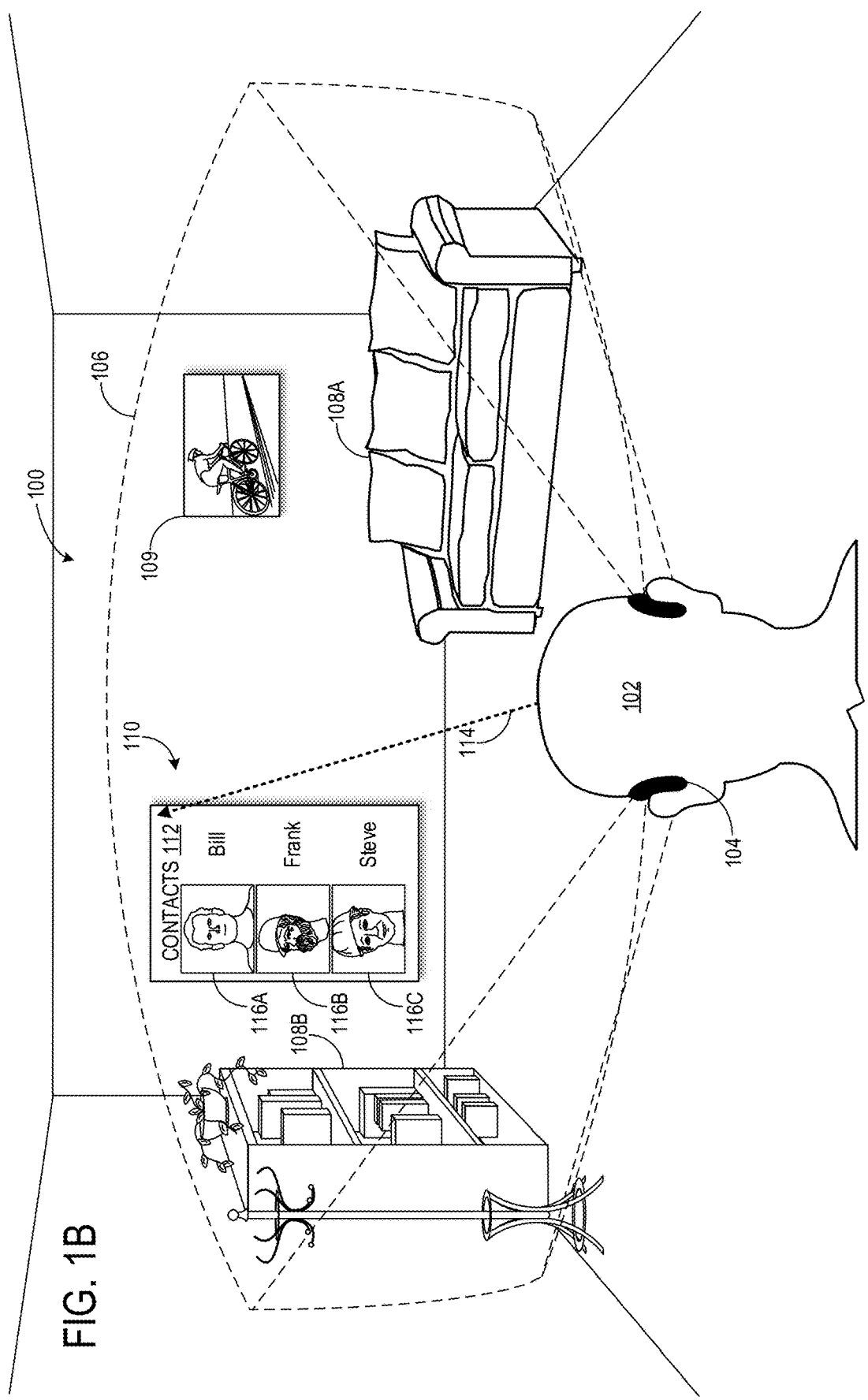
Figure 1C:
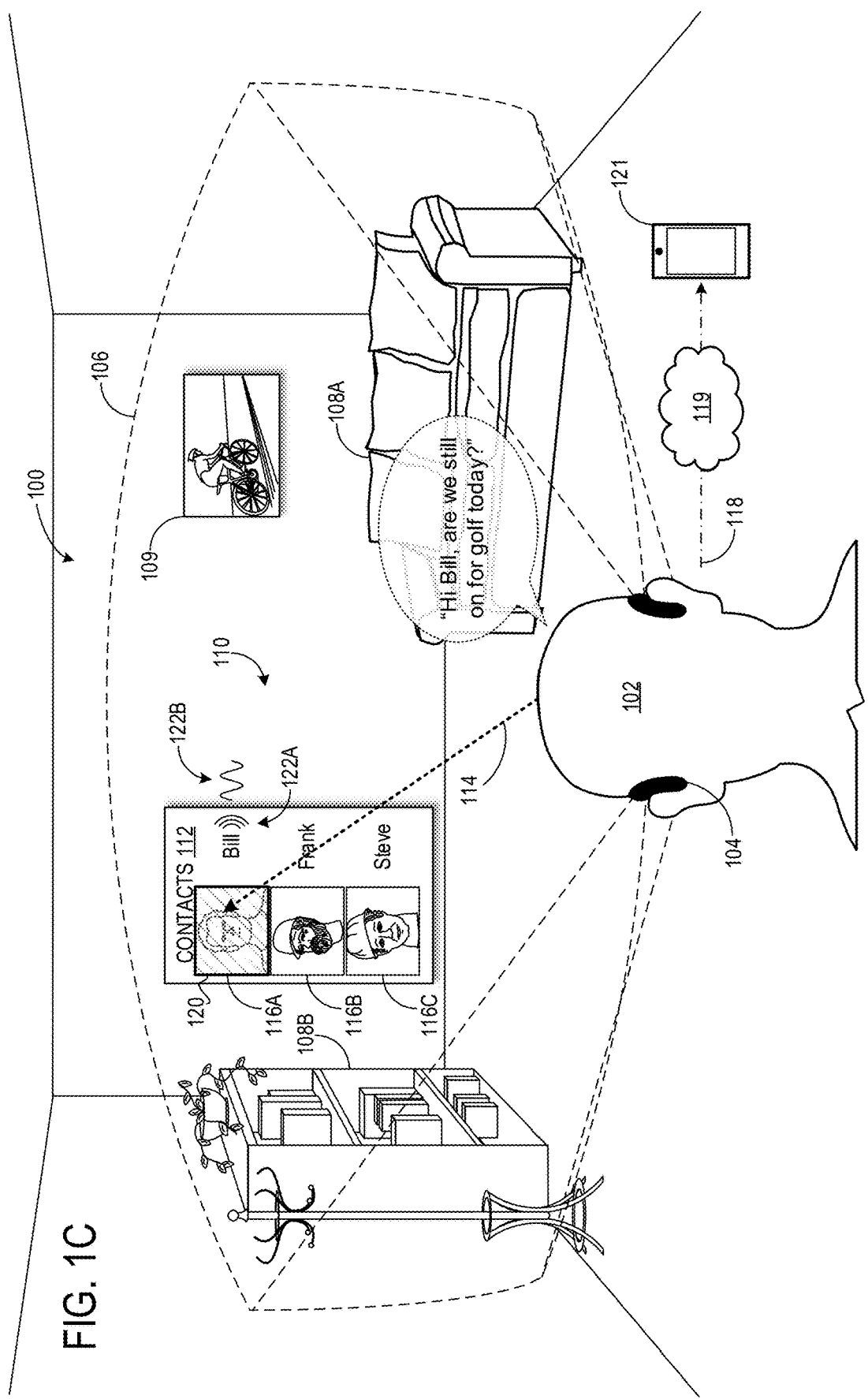

FIGS. 1A-1C show an example use environment 100 for a computing device in the form of a head-mounted display (HMD) device 104 worn by a user 102. Environment 100 is depicted as a home environment, though it will be appreciated that the approaches described herein may be used in any suitable environment, including but not limited to professional, commercial, educational, and outdoor environments.

HMD device 104 comprises a see-through display enabling the viewing of both real and presented virtual imagery to user 102, thereby providing a so-called "mixed reality" or "augmented reality" (AR) experience. The see-through display may thus enhance or otherwise alter user perception of environment 100 by modifying the appearance of the environment. Other display device types also may be used including displays operable to provide mixed reality or AR experiences without a see-through display. For example, a display device having a camera may display a mixed reality mode by displaying the real world background as a camera viewfinder image and mixing virtual imagery with the background viewfinder image. It will be appreciated that the examples disclosed herein also may be used with any other suitable type of display device.

Although not shown in FIGS. 1A-1C, HMD device 104 include or otherwise is operatively coupled to a computing device configured to effect the approaches described herein. The computing device may, for example, drive the see-through display of HMD device 104, render virtual imagery, receive user input from one or more sensors, and/or provide output to a communication subsystem. The computing device, one or more sensors, and/or communication subsystem, among other potential hardware, may be integrally housed in HMD device 104 or remotely housed and coupled to the HMD device. An example computing device is described below with reference to FIG. 5.

FIGS. 1A-1C also schematically depict a field of view (FOV) 106 of HMD device 104. FOV 106 represents the spatial region perceived by user 102 in which HMD device 104 may display virtual imagery. The angular extent of FOV 106 may be equal to, greater than, or less than the portion of the environment viewable through the see-through display of HMD device 104. In the depicted example, physical objects such as furniture items 108A and 108B, and virtual imagery such as an image 109 (a virtual picture displayed on a physical wall in environment 100) and a user interface 110, are perceptible to user 102 wearing HMD device 104.

User interface 110 takes the form of a contact list 112 that is shown in FIG. 1A in the unselected state. Selection of contact list 112, and the display of individual contacts therein, may be effected based on user inputs of position signals for user interface 110. A position signal may be provided, for example, by gaze tracking. FIG. 1A schematically shows a gaze direction 114 of user 102. The gaze direction may be determined, for example, via image data of the eyes of user 102. A gaze line may then be projected along a determined gaze direction, and a location at which the gaze line intersects a user interface may be used as a position signal for the user interface. Gaze lines may be determined separately for each eye in some implementations.

In other implementations, position signals may be controlled in any other suitable manner. For example, a cursor (not shown) displayed on a user interface may be controlled by hand gesture (e.g., detectable by outward facing image sensors), head gesture (e.g., detectable by motion sensors on HMD device 104), or other suitable control mechanism. The term "gesture" refer to any type of movement and/or posturing of a body part, and may include postures and/or motions performed alone or together, depending upon the type of sensor(s) used to detect the gesture.

In the example of FIG. 1A, the contact list 112 is shown in an unselected state to illustrate one non-limiting example mechanism that may be used to display a full contact list. FIG. 1B shows contact list 112 in the selected state, as user gaze direction 114 intersects or is within a threshold distance of the contact list on the user interface. In this state, individual contacts of contact list 112 are displayed. In other examples, display of contact list 112 may be initiated in any other suitable manner, such as by voice input, touch input (e.g. via a touch sensor integrated into or in communication with HMD device 104), etc. Further, in yet other examples, contact list 112 may be persistently displayed in user interface 110.

Each individual contact within the contact list is an example of a "proxy view" of the person represented by the contact. More specifically, contact 116A is an example proxy view for "Bill," contact 116B is an example proxy view for "Frank," and contact 116C is an example proxy view for "Steve." "Proxy view" as used herein refers to a visual representation of a contact, and may assume any suitable form. In the example shown in FIG. 1B, each proxy view 116A-C includes an image of the person corresponding to each contact. Proxy views also may include text, animated imagery, video, computer-generated avatars, and other displayed content. Such proxy views may be displayed within the context of a contact list, or may be images displayed in other contexts. Further, physical objects in environment 100 also may serve as proxy views for contacts, as described below.

FIG. 1C shows user gaze direction 114 intersecting contact 116A, thereby putting the contact "Bill" in a state in which communication may be initiated. Then, upon initiation of verbal communications with the selected contact, the words that are spoken are recorded and sent to the selected contact. The words may be sent as a real-time stream to a device associated with Bill, to a messaging, voicemail, or email account associated with Bill, or in any other suitable manner. Thus, in this example, a voice communications channel, represented schematically at 118, is established with the selected contact by simply gazing at the displayed proxy view and then speaking. The voice communication channel 118 is depicted as being opened across a network 119 to a receiving device, shown as a mobile phone 121 associated with the contact. It will be understood that the network represent a computer network, a telecommunications network, combinations thereof, and/or any other suitable type of network.

As mentioned above, proxy views may take other forms than contacts in a contact list. For example, other displayed virtual objects, such as image 109, may be designated a proxy view for a contact. Additionally, user 102 may tag content in a photo viewing or social networking application, or may designate physical objects in environment 100, as proxy views for contacts.

FIG. 2 shows non-limiting examples of physical objects as proxy views. First, in FIG. 2, user 102 is shown holding a mobile phone 202 on which an image of a person is displayed. The HMD device 104 may recognize the person via image data acquired by outward facing image sensors of HMD device 104. Then, when the user's gaze intersects the image of the person (e.g. as determined, for example, by projecting gaze lines beyond the display of the HMD device 104 and determining that the gaze lines intersect the image), HMD device 104 may enable the opening of a communication channel with a contact for whom the photo is a proxy view. A user interface object (e.g. a visual effect around the image of the person, a view of a contact list entry for the person, etc.) may be displayed on HMD device 104 to indicate that communication is enabled. In this state, speech made by user 102 may be recorded and then sent to the contact.

As another example, a physical portrait 208 of a person is displayed on a wall in environment 100 in FIG. 2. The portrait may have been designated as a proxy view by user 102, or may be recognized as an image of a contact via facial recognition and automatically designated as a proxy view for that contact. Selection of the portrait 208 may be determined by projecting gaze lines beyond the display of computing device 104 and into the physical environment to determine that the gaze lines intersect the portrait. A user interface object (e.g. a visual effect displayed around the image of the person, a view of a contact list entry for the person, etc.) may be displayed on HMD device 104 to indicate that the contact represented by the proxy view is selected for communication. In this state, speech made by user 102 may trigger the person's voice input to be recorded and then sent to the contact.

While the above-described examples are in the context of communication between user 102 and a single contact, it will be appreciated that the approaches described herein also may be employed for concurrent communication with two or more contacts. For example, a proxy view may be provided in the form of a group contact comprising two or more individual contacts. By selecting the group contact (e.g. by gazing at the proxy view) and initiating speaking to the contact, HMD device 104 may record the voice input and send the recorded voice input to the group contact.

As mentioned above, user 102 may select among various modes of voice communication to use to send speech to a contact. For example, real-time voice communication may be used, in which voice input is streamed to a selected contact as it is received. As another example, in a recorded message mode, a recording of the voice input may transmitted to a selected contact upon completion of the voice input, e.g., as a voicemail message, messaging service attachment, email attachment, etc. In the recorded message mode, user interface 110 may provide controls that enable user 102 to start, stop, edit, scrub, and/or transmit the recording, among other potential actions. Further, in the recorded message mode, a user confirmation step may be used for user 102 to confirm that a recording is to be transmitted, such that the message is not transmitted if confirmation is not received. The confirmation may be performed as a voice command, as an interaction with a user interface element (e.g. a "send" control selectable by gaze or other user input mode), or in any other suitable manner. The confirmation step may be a user-controllable preference, such that user 102 can choose whether or not recorded voice input is transmitted with or without confirmation. Further, such a confirmation setting may be selectable on a per-contact basis, such that confirmation may be used for some contacts but not others. Yet another voice communication mode may include a transcription mode in which voice input supplied by user 102 is transcribed to text and the transcribed text transmitted to a selected contact (e.g., as a text message). HMD device 104 may utilize any suitable speech-to-text conversion methods for such a communication mode.

The recorded voice input may be sent over any suitable communication channel using any suitable protocol(s). For example, voice communication channel 118 may employ voice over IP (VoIP), short message service (SMS), and/or multimedia messaging service (MMS) protocols. Further, voice communication channel 118 may employ typical mobile phone communication protocols. This may allow user 102 to place a phone call to the contact merely via a combination of gaze and speech. It will be appreciated that voice communication channel 118 may be unidirectional (e.g. analogous to "walkie-talkie" (handheld transceiver) communications) or bidirectional.

HMD device 104 may be configured to close voice communication channel 118 in response to any suitable condition. For example, HMD device 104 may close communications channel 118 in response to a user input. In such an example, user interface 110 may include a user interface element that, when selected (e.g., by gaze), closes voice communication channel 118. In such examples, a user may be able to look away from the proxy view and maintain voice communications once the communications channel is opened, such that a user can perform additional user interface interactions via gaze while talking with the contact. In another example, voice communication channel 118 may be closed in response to user gaze direction 114 moving out of intersection with proxy view 116A. Temporal and/or spatial thresholds may be employed so that the channel is not closed when a user looks briefly away, or the user's gaze wanders slightly out of the boundaries of the proxy view, but does not intend to cause the channel to close.

In some examples, additional data may be transferred to a selected contact with the voice input. In such examples, user 102 may be able to select any suitable data (e.g., images, video, email, executables) to transmit. Any suitable user input mechanism may be used to perform select data to send with a voice input. For example, the user may utilize a drag-and-drop process in which a visual representation of data such as an icon is dragged across user interface 110 (e.g. via gaze interaction, head motion, hand gesture, or other action) and dropped over a contact to effect transmission of the data. Such data may be transmitted over voice communication channel 118 or a separate transmission channel.

Visual feedback may be provided to user 102 during the contact selection and/or communication process. Referring again to FIGS. 1A-1C, FIG. 1C shows a virtual aura 120 displayed via the see-through display of HMD device 104 around the perimeter of proxy view 116A to visually convey the selection of the contact "Bill." Alternatively or additionally, the appearance of proxy view 116A itself may be modified in response to the selection of its contact, for example by shading the proxy view as shown in FIG. 1C. Similar effects may be applied to physical objects via the see-through display. Other non-limiting examples of visual feedback are shown as indicator 122A indicating opening of voice communication channel 118 and an indicator 122B indicating transmission of voice input.

It will be appreciated that other forms of user input than gaze may be used to select a contact for voice communication. For example, HMD device 104 may receive (e.g., via an imaging system) gesture inputs from user 102, such as hand gestures, head gestures, and other types of motion inputs to control a user interface cursor (not shown) in user interface 110.

The approaches described herein may be implemented on hardware other than HMD device 104. As a non-limiting example, the contact selection and/or communication processes described herein may be employed in a virtual reality (VR) HMD device configured to substantially replace a user's FOV with virtual imagery with an opaque display. In this case, proxy views comprising virtual representations of their contacts may be displayed. Non-wearable devices are also within the scope of this disclosure, including but not limited to mobile computing devices (e.g. phones, tablets, laptop computers), as well as game consoles, desktop computers, etc. Various sensors, including but not limited to image sensors, may be used with any of these device to receive user inputs.

FIG. 3 shows a flowchart illustrating a method 300 of performing voice communication over a network via a computing device. Method 300 may be implemented by any suitable computing device, including but not limited to HMD device 104 of FIGS. 1A-1C and HMD device 400 of FIG. 4 (described below).

At 302, method 300 comprises displaying a user interface on a display. Displaying the user interface may include, at 304, displaying the user interface on a see-through head mounted display (HMD) device, or on any other suitable computing device. Method 300 further comprises, at 306, receiving a user input of a position signal for the user interface. The position signal may comprise a location at which a user gaze direction intersects the user interface, or a cursor position controlled by hand gesture, head gesture, eye gaze, etc. As such, receiving the user input of the position signal may include, at 308, using sensor data to determine a gaze direction and also a location at which the gaze direction intersects the user interface.

Continuing, method 300 includes, at 310, determining whether the position signal satisfies a selection condition for a contact. As indicated at 312, this may be based upon a location at which the position signal intersects the user interface compared to a position of a proxy view of the contact, e.g., such that the position signal is within a threshold distance of, or intersecting, the proxy view. The selection condition also may comprise a threshold duration for which the position signal is within the threshold proximity to the proxy view. If it is determined that the position signal does not satisfy the selection condition for the contact (NO), method 300 returns to 306. On the other hand, if it is determined that the position signal does satisfy the selection condition for the contact (YES), method 300 proceeds to 318, where the contact is selected for communication. This may include, at 320, displaying an indication of the selection of the contact for communication.

Continuing with FIG. 3, method 300 comprises, at 322, receiving voice input. Further, in response to receiving the voice input, method 300 comprises, at 324, opening a voice communication channel with the selected contact and sending the voice input to the contact via the voice communication channel. Sending the voice input may include, at 326, sending the voice input as a recording, or, at 328, as a live audio stream in real time. Sending the voice input further may include, at 330, producing a transcription of the voice input and sending the transcription to the selected contact. Additionally, sending the voice input may include, at 332, opening a respective voice communication channel for each of two or more contacts in a group contact and sending the voice input to each of the two or more contacts. Method 300 further may comprise, at 334, receiving a user selection of data and sending the user-selected data to the selected contact, either by a same channel or a different channel as the voice input.

Figure 4:
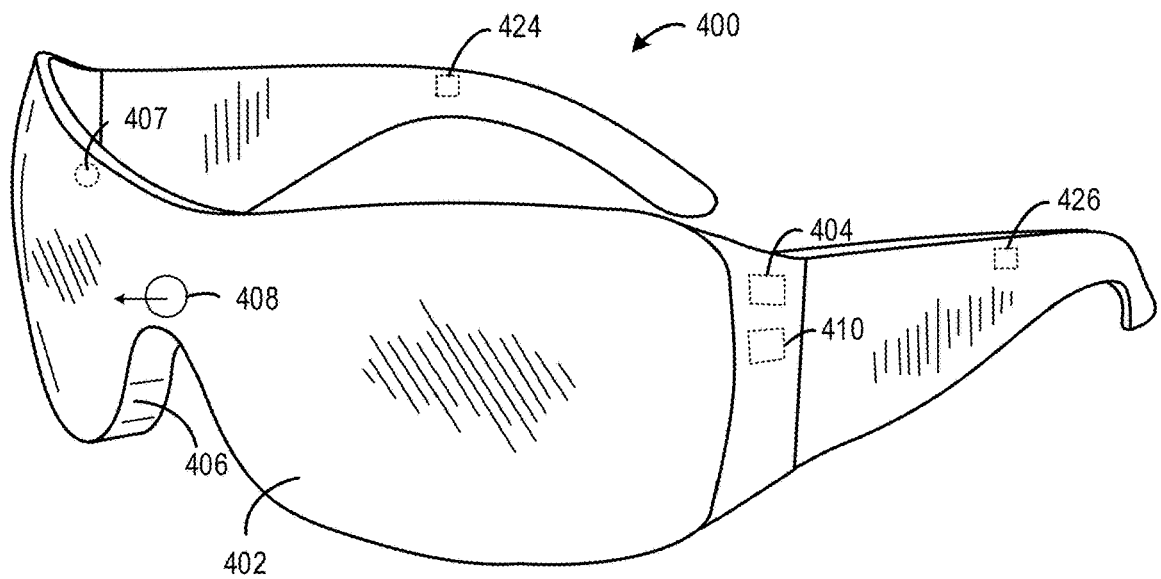
FIG. 4 shows an example head-mounted display (HMD) device.

FIG. 4 shows a non-limiting example of an HMD device 400 in the form of a pair of wearable glasses with a transparent display 402. It will be appreciated that an HMD device may take any other suitable form in which a transparent, semi-transparent, and/or non-transparent display is supported in front of a viewer's eye or eyes.

The HMD device 400 includes a controller 404 configured to control operation of the see-through display 402. The see-through display 402 may enable images such as holographic objects to be delivered to the eyes of a wearer of the HMD device 400. The see-through display 402 may be configured to visually augment an appearance of a real-world, physical environment to a wearer viewing the physical environment through the transparent display. For example, the appearance of the physical environment may be augmented by graphical content that is presented via the transparent display 402 to create a mixed reality environment. In one example, the display may be configured to display one or more visual digital content items. In some cases, the digital content items may be virtual objects overlaid in front of the real-world environment. Likewise, in some cases, the digital content items may incorporate elements of real-world objects of the real-world environment seen through the transparent display 402.

Any suitable mechanism may be used to display images via transparent display 402. For example, transparent display 402 may include image-producing elements located within lenses 406 (such as, for example, a see-through Organic Light-Emitting Diode (OLED) display). As another example, the transparent display 402 may include a light modulator located within a frame of HMD device 400. In this example, the lenses 406 may serve as a light guide for delivering light from the light modulator to the eyes of a wearer. Such a light guide may enable a wearer to perceive a 3D holographic image located within the physical environment that the wearer is viewing, while also allowing the wearer to view physical objects in the physical environment, thus creating a mixed reality environment.

The HMD device 400 may also include various sensors and related systems to provide information to the controller 404. Such sensors may include, but are not limited to, one or more microphones 407 (or a microphone array), one or more outward-facing image sensors 408, and an inertial measurement unit (IMU) 410.

The one or more outward-facing image sensors 408 may be configured to capture visual data from the physical environment in which the HMD device 400 is located. For example, the outward-facing sensors 408 may be configured to detect movements within a field of view of the display 402, such as movements performed by a wearer or by a person or physical object within the field of view. In one example, the outward-facing sensors 408 may detect a user speaking to a wearer of the HMD device. The outward-facing sensors may also capture 2D image information and depth information from the physical environment and physical objects within the environment. As discussed above, data collected by the outward-facing sensors 408 may be used to recognize virtual and/or physical proxy views of contacts, and/or to recognize gesture input (e.g., hand gestures) supplied by a wearer to assess selection condition satisfaction for contacts.

The IMU 410 may be configured to provide position and/or orientation data of the HMD device 400 to the controller 404. In some implementations the IMU 410 may be configured as a three-axis or three-degree of freedom position sensor system, while in others, the IMU may be configured as a six-axis or six-degree of freedom position sensor system.

The HMD device 400 may further include speakers 424 and 426 configured to output sound to the wearer of the HMD device. The speakers 424 and 426 may be positioned on each side frame portion of the HMD device proximate to the wearer's ears.

The controller 404 may include a logic device and a storage device that may be in communication with the various sensors and display of the HMD device 400. In one example, the storage device may include instructions that are executable by the logic device to display a user interface on a head mounted display, receive gaze data from one or more sensors located on the head mounted display, the gaze data indicating a user gaze direction relative to the user interface, determine that the user gaze direction intersects a proxy view of a contact, responsive to determining that the user gaze direction intersects the proxy view, select the contact for communication, receive user voice input, and responsive to receiving the user voice input while the contact is selected for communication, opening a voice communication channel with the contact and sending the user voice input to the contact via the voice communication channel.

Figure 5:
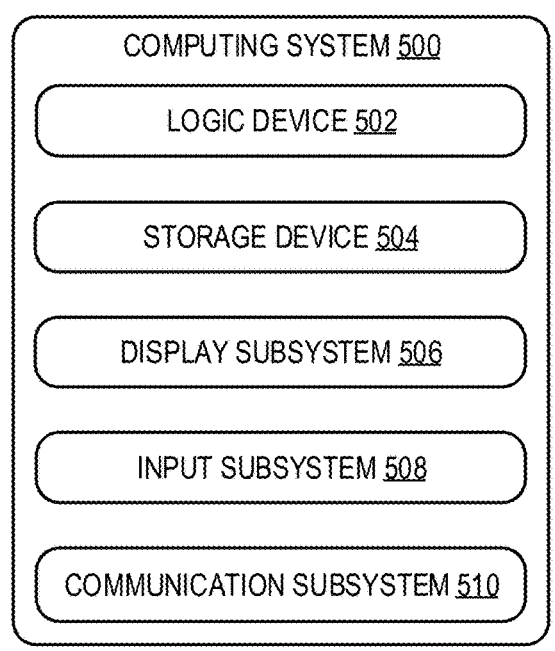
FIG. 5 shows an example computing system.

HMD device 400 is one example of a computing system on which the examples disclosed herein may be implemented. More generally, FIG. 5 schematically shows a block diagram of an example computing system 500 in simplified form. In addition to the HMD devices described herein, computing system 500 may take the form of one or more personal computers, server computers, tablet computers, home-entertainment computers, network computing devices, gaming devices, mobile computing devices, mobile communication devices (e.g., smart phone), and/or other computing devices.

Computing system 500 includes a logic device 502 and a storage device 504. Computing system 500 may optionally include a display subsystem 505, input subsystem 508, communication subsystem 510, and/or other components not shown in FIG. 5.

Logic device 502 includes one or more physical devices configured to execute instructions. For example, the logic device may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic device may include one or more processors configured to execute software instructions. Additionally or alternatively, the logic device may include one or more hardware or firmware logic devices configured to execute hardware or firmware instructions. Processors of the logic device may be single-core or multi-core, and the instructions executed thereon may be configured for sequential, parallel, and/or distributed processing. Individual components of the logic device optionally may be distributed among two or more separate devices, which may be remotely located and/or configured for coordinated processing. Aspects of the logic device may be virtualized and executed by remotely accessible, networked computing devices configured in a cloud-computing configuration.

Storage device 504 includes one or more physical devices configured to hold instructions executable by the logic device to implement the methods and processes described herein. When such methods and processes are implemented, the state of storage device 504 may be transformed—e.g., to hold different data.

Storage device 504 may include removable and/or built-in devices. Storage device 504 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage device 504 may include volatile, nonvolatile, dynamic, static, read/write, read-only, random-access, sequential-access, location-addressable, file-addressable, and/or content-addressable devices.

It will be appreciated that storage device 504 includes one or more physical devices. However, aspects of the instructions described herein alternatively may be propagated by a communication medium (e.g., an electromagnetic signal, an optical signal, etc.) that is not held by a physical device for a finite duration.

Aspects of logic device 502 and storage device 504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

It will be appreciated that a "service", as used herein, is an application program executable across multiple user sessions. A service may be available to one or more system components, programs, and/or other services. In some implementations, a service may run on one or more server-computing devices.

When included, display subsystem 505 may be used to present a visual representation of data held by storage device 504. This visual representation may take the form of a graphical user interface (GUI). As the herein described methods and processes change the data held by the storage device, and thus transform the state of the storage device, the state of display subsystem 505 may likewise be transformed to visually represent changes in the underlying data. Display subsystem 505 may include one or more display devices utilizing virtually any type of technology. Such display devices may be combined with logic device 502 and/or storage device 504 in a shared enclosure, or such display devices may be peripheral display devices.

When included, input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 may be configured to communicatively couple computing system 500 with one or more other computing devices. Communication subsystem 510 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

Another example provides, on a computing device comprising a display, a method of facilitating user communication, comprising displaying a user interface on the display, receiving a user input of a position signal for the user interface, determining that the position signal satisfies a selection condition for a contact based on a location of the position signal on the user interface and a position of a proxy view of the contact on the user interface, in response to determining that the position signal satisfies the selection condition, selecting the contact for communication, receiving voice input, and responsive to receiving the voice input while the contact is selected for communication, opening a voice communication channel with the contact and sending the voice input to the contact via the voice communication channel. In such an example, the selection condition alternatively or additionally may comprise a threshold proximity of the position signal to the proxy view. In such an example, the selection condition alternatively or additionally may comprise a threshold duration for which the position signal is within the threshold proximity. In such an example, the voice input alternatively or additionally may be sent to the contact via the voice communication channel as a recording. In such an example, the voice input alternatively or additionally may be sent to the contact via the voice communication channel as a live audio stream in real time. In such an example, sending the voice input to the contact via the voice communication channel alternatively or additionally may include producing a transcription of the voice input and sending the transcription to the contact. In such an example, the proxy view alternatively or additionally may comprise a physical representation of the contact in physical space. In such an example, the proxy view alternatively or additionally may comprise a virtual representation of the contact. In such an example, the contact alternatively or additionally may be a group contact comprising two or more contacts. In such an example, opening the voice communication channel with the contact alternatively or additionally may include opening respective voice communication channels for each of the two or more contacts. In such an example, sending the voice input to the contact alternatively or additionally may include sending the voice input to each of the two or more contacts. In such an example, the method alternatively or additionally may comprise receiving a user selection of data, and responsive to receiving the user selection of the data while the contact is selected for communication, sending the data to the contact. In such an example, the display alternatively or additionally may be a head mounted display. Any or all of the above-described examples may be combined in any suitable manner in various implementations.

Another example provides a method of operating a head mounted display, comprising displaying a user interface on the head mounted display, receiving sensor data indicating a user gaze direction relative to the user interface, determining that the user gaze direction intersects a proxy view of a contact, responsive to determining that the user gaze direction intersects the proxy view, selecting the contact for communication, receiving user voice input, and responsive to receiving the user voice input while the contact is selected for communication, opening a voice communication channel with the contact and sending the user voice input to the contact via the voice communication channel. In such an example, the sensor data alternatively or additionally may be head motion data indicating the user gaze direction. In such an example, the sensor data alternatively or additionally may be eye gaze data indicating the user gaze direction. In such an example, the proxy view alternatively or additionally may comprise a user interface object displayed in the user interface. In such an example, the proxy view alternatively or additionally may comprise a physical representation of the contact in physical space. In such an example, the method alternatively or additionally may comprise displaying in the user interface an indication of the selection of the contact. In such an example, the method alternatively or additionally may comprise displaying in the user interface an indication of the opening of the voice communication channel. Any or all of the above-described examples may be combined in any suitable manner in various implementations.

Another example provides a head mounted display system, comprising a computing device comprising a logic subsystem and a storage subsystem storing instructions executable by the logic subsystem to display a user interface on the head mounted display, receive gaze data from one or more sensors located on the head mounted display, the gaze data indicating a user gaze direction relative to the user interface, determine that the user gaze direction intersects a proxy view of a contact, responsive to determining that the user gaze direction intersects the proxy view, select the contact for communication, receive user voice input, and responsive to receiving the user voice input while the contact is selected for communication, opening a voice communication channel with the contact and sending the user voice input to the contact via the voice communication channel. In such an example, the proxy view alternatively or additionally may comprise one of a physical representation of the contact in physical space and a user interface object displayed in the user interface. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a computing device comprising a display, a method of facilitating user communication, comprising:
    displaying a user interface on the display;
    receiving a user input of a position signal for the user interface, the user input comprising one or more of a gaze and a gesture;
    determining that the position signal satisfies a selection condition for a contact based on a location of the position signal on the user interface and a position of a proxy view of the contact on the user interface, the selection condition comprising a threshold duration for which the position signal is held within a threshold proximity of the proxy view;
    in response to determining that the position signal satisfies the selection condition, selecting the contact for communication;
    displaying, on the user interface, visual feedback indicating that communication with the contact is enabled;
    receiving voice input comprising a commencement of voice communication with the contact;
    upon initiation of the voice communication with the contact, recording the voice communication while communication with the contact is enabled via the position signal, and
    sending the voice communication recorded to the contact, thereby opening a voice communication channel with the contact.

2. The method of claim 1, wherein one or more voice communications are also sent to the contact via the voice communication channel as a live audio stream in real time.

3. The method of claim 1, wherein sending the voice communication recorded to the contact includes producing a transcription of the voice communication and sending the transcription to the contact.

4. The method of claim 1, wherein the proxy view comprises a physical representation of the contact in physical space.

5. The method of claim 1, wherein the proxy view comprises a virtual representation of the contact.

6. The method of claim 1, wherein the contact is a group contact comprising two or more contacts, and
    wherein sending the voice communication recorded to the contact includes sending the voice communication recorded to each of the two or more contacts, thereby opening respective voice communication channels with each of the two or more contacts.

7. The method of claim 1, further comprising:
    receiving a user selection of data; and
    responsive to receiving the user selection of the data while communication with the contact is enabled via the position signal, sending the data to the contact.

8. The method of claim 1, wherein the display is a head mounted display.

9. A method of operating a head mounted display, comprising:
    displaying a user interface on the head mounted display;
    receiving sensor data indicating a user gaze direction relative to the user interface;
    determining that the user gaze direction intersects a proxy view of a contact for a threshold duration;
    responsive to determining that the user gaze direction intersects the proxy view for the threshold duration, selecting the contact for communication;
    displaying, in the user interface, visual feedback indicating that communication with the contact is enabled;
    receiving user voice input comprising a commencement of voice communication with the contact;
    upon initiation of the voice communication with the contact, recording the voice communication while communication with the contact is enabled via the user gaze direction, and
    sending the voice communication recorded to the contact, thereby opening a voice communication channel with the contact.

10. The method of claim 9, wherein the sensor data comprises head motion data indicating the user gaze direction.

11. The method of claim 9, wherein the sensor data is eye gaze data indicating the user gaze direction.

12. The method of claim 9, wherein the proxy view comprises a user interface object displayed in the user interface.

13. The method of claim 9, wherein the proxy view comprises a physical representation of the contact in physical space.

14. The method of claim 9, wherein displaying the visual feedback in the user interface comprises shading the proxy view.

15. The method of claim 9, further comprising displaying in the user interface an indication of the opening of the voice communication channel.

16. A head mounted display system, comprising:
a computing device comprising a logic subsystem and a storage subsystem storing instructions executable by the logic subsystem to:
display a user interface on the head mounted display;
receive gaze data from one or more sensors located on the head mounted display, the gaze data indicating a user gaze direction relative to the user interface;
determine that the user gaze direction intersects a proxy view of a contact for a threshold duration;
responsive to determining that the user gaze direction intersects the proxy view for the threshold duration select the contact for communication;
display, in the user interface, visual feedback indicating that communication with the contact is enabled;
receive user voice input comprising a commencement of voice communication with the contact;
upon initiation of the voice communication with the contact, record the voice communication while communication with the contact is enabled via the user gaze direction, and
send the voice communication recorded to the contact, thereby opening a voice communication channel with the contact.

17. The head mounted display system of claim 16, wherein the proxy view comprises one of a physical representation of the contact in physical space and a user interface object displayed in the user interface.

* * * * *